US012571413B2

(12) United States Patent
Cis et al.

(10) Patent No.: US 12,571,413 B2
(45) Date of Patent: Mar. 10, 2026

(54) SERVOVALVE

(71) Applicant: Hamilton Sundstrand Corporation, Charlotte, NC (US)

(72) Inventors: Marcin Cis, Lutynia (PL); Michał Bieleń, Bielawki (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/615,269

(22) Filed: Mar. 25, 2024

(65) Prior Publication Data

US 2024/0328437 A1 Oct. 3, 2024

(30) Foreign Application Priority Data

Mar. 28, 2023 (EP) .................................... 23461540

(51) Int. Cl.
*F15B 13/04* (2006.01)
*F15B 13/043* (2006.01)

(52) U.S. Cl.
CPC ...... *F15B 13/0436* (2013.01); *F15B 13/0402* (2013.01)

(58) Field of Classification Search
CPC .............. F15B 13/0436; F15B 13/0402; F15B 2211/615; F15B 21/041
See application file for complete search history.

(56) References Cited

U.S. PATENT DOCUMENTS 2,601,207 A 6/1952 Jacques
3,081,787 A 3/1963 Meulendyk
3,692,041 A 9/1972 Bondi
4,046,061 A 9/1977 Stokes
4,922,963 A 5/1990 Robinson
5,197,516 A 3/1993 Smietana
6,786,238 B2 9/2004 Frisch
9,309,900 B2 4/2016 Kopp
11,060,631 B2 7/2021 Cis et al.
2015/0047729 A1 2/2015 Kopp et al.
2018/0135661 A1* 5/2018 Cis ............................ F15B 9/07
2019/0024818 A1* 1/2019 Cis .......................... F16K 51/00

FOREIGN PATENT DOCUMENTS

EP 3321513 A1 5/2018
GB 2104249 A 3/1983

OTHER PUBLICATIONS

European Search Report for Application No. 23461540.9, mailed Sep. 19, 2023, 10 pages.

* cited by examiner

*Primary Examiner* — Kelsey E Cary
(74) *Attorney, Agent, or Firm* — CANTOR COLBURN LLP

(57) ABSTRACT

A servovalve includes a fluid transfer valve assembly comprising a primary fluid supply port and a control port, a moveable valve spool arranged to regulate flow of fluid through a first fluid pathway from the primary fluid supply port to the control port, and a jet pipe assembly configured to axially move the spool relative to the fluid transfer valve assembly in response to a control signal to regulate the fluid flow along the first fluid pathway. The jet pipe assembly comprises a steerable nozzle from which fluid is directed to the ends of the spool in an amount determined by the control signal. The spool comprises an opening and an interior passage fluidly coupling the opening to the jet pipe assembly via a second fluid pathway. The first fluid pathway is fluidly isolated from the second fluid pathway within the spool.

12 Claims, 6 Drawing Sheets

SERVOVALVE

CROSS REFERENCE TO RELATED APPLICATIONS

This application claims priority to European Patent Application No. 23461540.9 filed Mar. 28, 2023, the entire contents of which is incorporated herein by reference.

TECHNICAL FIELD

The invention relates to servovalves and aircraft controls, more particularly to servovalves for fluidic actuators used to transfer quantities of, or manage the flow of fluid to said actuators. The invention may apply equally to hydraulic or pneumatic actuators.

BACKGROUND

Servovalves find a wide range of applications for controlling air or other fluid flow to effect driving or control of another part e.g. an actuator.

A servovalve assembly includes a motor controlled by a control current which controls flow to a valve e.g. a hydraulic valve or an air valve to control an actuator. Generally, a servovalve transforms an input control signal into movement of an actuator cylinder. The actuator controls e.g. an air valve. In other words, a servovalve acts as a controller, which commands the actuator, which changes the position of a flight control actuator or an air valve's (e.g. a so-called butterfly valve's) flow modulating feature.

Such mechanisms are used, for example, in various parts of aircraft where the management of air/fluid flow is required, such as in flight control actuators or engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper of a jet, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centred. The clevis, however, needs to be big due to the requirement for bigger orifices to handle larger flows.

Jet pipe servovalves provide an alternative to 'flapper'—type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centred—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centred position. A change in motor current moves the spool to a new position corresponding to the applied current.

As mentioned above, jet pipe servovalves are advantageous in that they are less sensitive to contamination e.g. in the supply fluid or from the valve environment. These valves are, however, more complex and bulkier. Additional joints are required for the fluid supply pipe and the supply pipe from the fluid supply to the jet pipe is mounted outside of the servovalve body in the torque motor chamber. In the event of damage to the pipe, this can result in external leakage. The pipe, being external, adds to the overall size and is more vulnerable to damage.

There is a need for a servovalve arrangement that can handle large fluid flows effectively, whilst retaining a compact design and being less vulnerable to contamination, damage and leakage.

European Patent Application 16461572 teaches a jet-pipe type servovalve wherein fluid is provided to the nozzle via a connector header in fluid communication with the interior of the spool, the spool being provided with one or more openings via which fluid from the supply port enters the interior of the spool and flows into the connector header and to the nozzle.

The servovalve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring.

There is, a need to provide a simpler, more convenient and reliable jet-pipe servovalve.

Conventionally, the fluid will be filtered by an external filter before it enters the jet pipe. This, however, requires filter components to be incorporated in e.g. the connector header, which is difficult to do.

There is, therefore, also a need to provide a simpler, more convenient and reliable fluid filtering in such a jet-pipe servovalve.

SUMMARY

In one aspect a servovalve is provided comprising a fluid transfer valve assembly (e.g., a housing or a supporting block) comprising a primary fluid supply port and a control port, a moveable valve spool arranged to regulate flow of fluid through a first fluid pathway from the primary fluid supply port to the control port, and a jet pipe assembly configured to axially move the spool relative to the fluid transfer valve assembly in response to a control signal to regulate the fluid flow along the first fluid pathway. The jet pipe assembly comprises a steerable nozzle from which fluid is directed to the ends of the spool in an amount determined by the control signal. The spool comprises an opening and an interior passage fluidly coupling the opening to the jet pipe assembly (e.g., for supplying fluid to the nozzle) via a second fluid pathway (e.g., by fluidly coupling the opening to the nozzle). The first fluid pathway is fluidly isolated from the second fluid pathway within the spool.

Fluidly isolating the first fluid pathway from the second fluid pathway allows for independent pressure and quality control of each of the control fluid (the fluid used to control the position of the spool) and regulated fluid (the fluid which is regulated through or by the servovalve between the primary fluid supply port and the control port). For example, the control fluid may be subject to higher quality requirements and may thusly be filtered. The pressure of the control fluid and regulated fluid may also be controlled independently. For example, the control pressure (of the control fluid) may be kept constant, while the regulated pressure (e.g., the pressure of the regulated fluid supplied at the primary fluid supply port) may be allowed to vary.

The fluid transfer valve assembly may comprise a secondary fluid supply conduit having a first end configured to be fluidly coupled to a source of pressurised fluid and a second end coupled to a secondary fluid supply port adjacent the opening of the spool.

The secondary fluid supply conduit may be provided with a filter for filtering fluid from the source of pressurised fluid before it enters the interior passage of the spool.

Filtering the fluid in the secondary fluid supply conduit allows for tighter control of control fluid to avoid clogging of the jet pipe/nozzle etc. due to contamination in the fluid. Alternatively, the fluid supplied to the secondary fluid supply conduit (e.g., from a source of pressurised control fluid) may be independently filtered before entering the fluid transfer valve assembly.

The spool may comprise a secondary fluid supply annulus fluidly coupling the secondary fluid supply port to the opening, and wherein an axial length of the secondary fluid supply annulus is equal to or greater than a maximum travel of the spool.

The fluid transfer valve assembly may comprise a primary supply conduit coupled to the primary fluid supply port and a control conduit coupled to the control port.

The primary fluid supply port and the secondary fluid supply port may be configured to be coupled to a common source of pressurised fluid.

For example, the secondary fluid supply conduit may be divided from (e.g., branch off from) the primary supply conduit.

The opening may be a first opening (or a first set of openings) provided towards a first end of the spool. The spool may comprise a second opening (or a second set of openings) provided towards a second end of the spool. The interior passage may fluidly couple the second opening to the jet pipe assembly via the second fluid pathway.

The servovalve may comprise a driver for steering the nozzle in response to the control signal. The driver may comprise a motor arranged to steer the nozzle by means of an induced current. The driver may be hydraulic power source arranged to steer the nozzle by hydraulic flow.

The nozzle may be provided at an end of a jet pipe and fluid from the nozzle may be directed into the valve assembly via a receiver. The receiver may comprise lateral receiver channels to provide flow to each side of the fluid transfer valve assembly. The receiver may be configured such that when the nozzle is in a central position, fluid enters the fluid transfer valve assembly evenly via both sides of the receiver, and when the nozzle is steered to an off-centre position, more fluid flows to one side of the fluid transfer valve assembly than the other via the receiver.

The fluid transfer valve assembly may comprise a second control port and a return port for low pressure fluid returning through the servovalve (e.g., regulated fluid downstream from the control port).

The nozzle may be provided on a jet pipe and mounted within a flexible tube. The flexible tube may be configured to impart movement to the nozzle to steer the nozzle in response to the control signal.

In another aspect a spool is provided defining one or more exterior fluid pathways for regulated fluid flow and an interior passage for control fluid flow, the spool being provided with one or more openings via which, in use, fluid enters the interior passage. The spool is configured to fluidly isolate the interior passage from the exterior fluid pathways, when in use.

The spool may be configured attach to a jet pipe assembly comprising a steerable nozzle. The interior passage may be for supplying fluid to the steerable nozzle.

In another aspect a method of manufacturing a spool for a servovalve is provided, the method comprising providing an exterior pathway for regulated fluid flow, providing an interior pathway for control fluid flow, and providing one or more openings in the spool via which, in use, fluid enters the interior pathway. The spool is configured to fluidly isolate the interior pathway from the exterior pathway, when in use.

Preferred embodiments will now be described with reference to the drawings.

DETAILED DESCRIPTION

A servovalve as described below can, for example, be used in an actuator control system. The servovalve is controlled by a torque motor to control a control flow of fluid that is output via e.g. a butterfly value to control the movement of an actuator.

Figure 1:
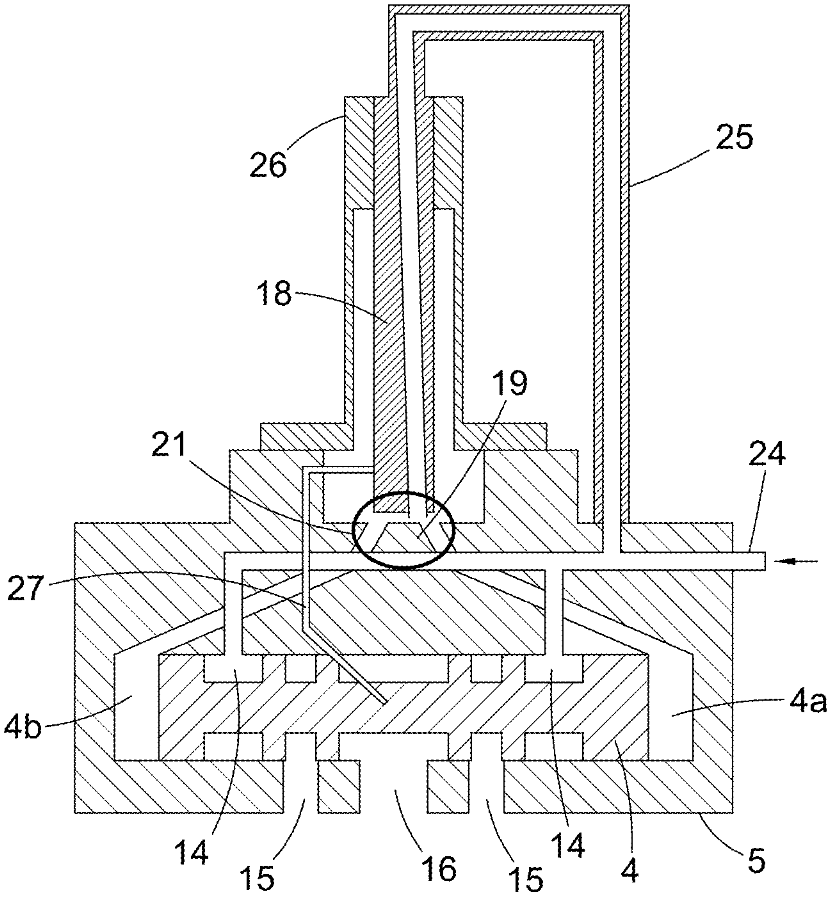
FIG. 1 PRIOR ART
FIG. 1 is a schematic view of a conventional jet-pipe type servovalve.

A conventional jet pipe servovalve will first be described with reference to FIG. 1. The arrangement comprises a servovalve assembly have a torque motor and a moveable spool 4 mounted in a support 5 (e.g., a housing, a supporting block or a fluid transfer valve assembly), or mounted in a cylinder mounted in a block. The spool is part of a spool assembly having: supply ports 14, control ports 15, and a return port 16 (e.g., a suction port). Flow is possible between the ports via a passage through the spool. The torque motor (not shown) provides current that causes a jet pipe 18 to turn at its end closest to the spool, which end terminates in a nozzle 19. Supply fluid is provided from the supply port, via a supply pipe 25 to the top of the jet pipe—i.e. the end opposite the end with the nozzle, and the supply fluid flows through the jet pipe and out of the nozzle. A receiver 21 is provided in the support 5 below the nozzle. The receiver provides two channels 21*a*, 21*b* via which fluid from the nozzle 19 flows to the ends of the spool 4. When no current is applied by the motor to the jet pipe, the nozzle is centred relative to the receiver 21 and supply fluid exiting the nozzle flows equally through both channels and thus equally to both ends of the spool. The spool therefore remains centred—i.e. 'closed' so that no fluid flows through the control ports. When actuator control is desired, the motor provides a control current, for example, for energising a coil to cause an armature to rotate due magnetic coupling. The armature may be attached to jet pipe and to rotate it and cause the nozzle to turn away from the centred position. The supply fluid through the nozzle then flows predominantly through one receiver channel as compared to the other channel resulting in a relative increase in the pressure differential between spool ends. More fluid flows, therefore, into the corresponding end of the spool causing axial movement of the spool with either blocks/occludes the passage between the supply port and the respective control port or opens the passage to allow flow between the two ports, depending on the axial position of the spool due to the position of the nozzle, thus modulating pressure on the control ports and controlling the actuator.

In an example, the assembly is arranged to control an actuator based on the fluid flow from the control port e.g. via a butterfly valve. The servovalve controls an actuator which, in turn, controls an air valve such as a butterfly valve.

Supply pressure is provided to the servovalve housing via supply port 24 and to the spool via spool supply ports 14. The pressure at return port 16 is a return pressure which will be relatively constant or may vary depending e.g. on the altitude of the aircraft in flight. Control ports 15 provide a controlled output pressure, dependent on the nozzle position and resulting spool position, to be provided to an actuator. A supply pipe 25 is also connected to the supply port and routes supply fluid external to the spool and into the top end of the jet pipe. The supply fluid flows down the jet pipe to the nozzle and exits to the receiver described above. The jet pipe is preferably mounted in a flexural tube 26. While the nozzle is centred, equal amounts of fluid go to the two ends 4*a*,4*b* of the spool.

The spool 4 is in the form of a tubular member arranged in the support 5 to be moved axially (e.g., along an axis or axis of movement) by fluid from the jet pipe via the nozzle that is directed at the spool via the receiver. End caps seal the ends of the tubular member.

A feedback spring 27 serves to return the nozzle to the centred position.

In more detail, to open the servovalve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle 19 turns. The more it turns, the greater the linear or axial movement of the spool 4. A torque motor usually consists of coil windings, a ferromagnetic armature, permanent magnets and a mechanical spring (e.g. two torsional bridge shafts). This arrangement provides movement of the nozzle proportional to the input control current. Other types of motor could be envisaged.

Figure 2:
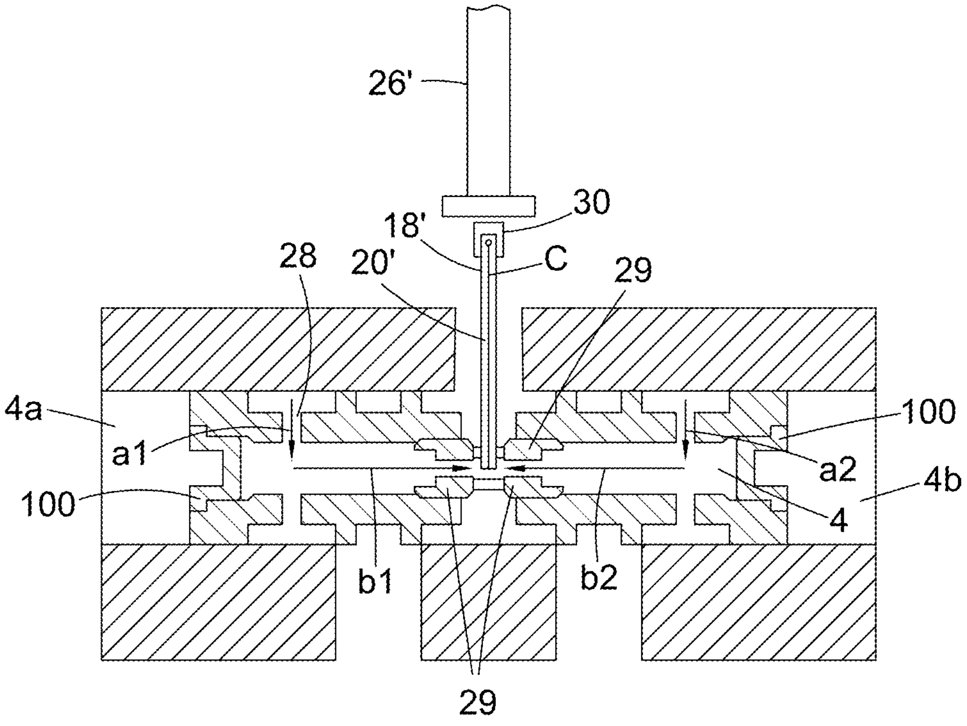
FIG. 2 PRIOR ART
FIG. 2 is a cut-away view of a servovalve according to e.g. EP16461572.
Figure 2A:
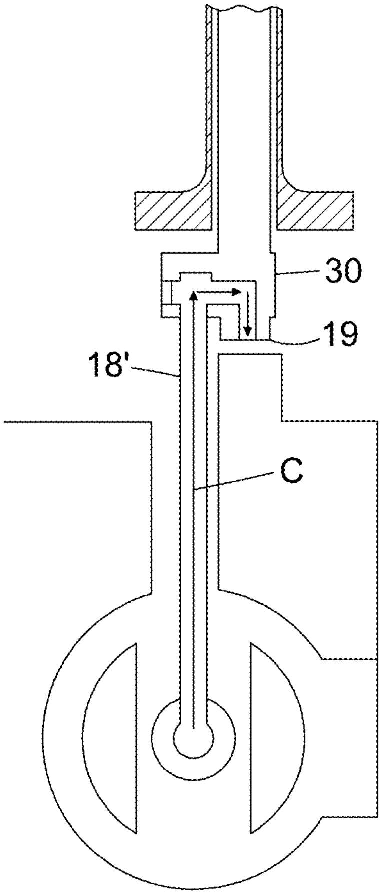
FIG. 2A PRIOR ART
FIG. 2A is a detail of the servovalve of FIG. 2.

The servovalve assembly of EP 16461572, described with reference to FIGS. 2 and 2A, avoids the need for the supply pipe 25, thus avoiding many of the disadvantages of conventional jet pipe servovalves. Instead of providing supply fluid to the jet pipe externally, in the present disclosure the supply fluid is provided to the jet pipe from inside the servovalve assembly, using the flow of supply fluid provided to the spool supply ports. To do this, openings 28 are provided in the wall of the spool 4 to enable the supply fluid provided to the spool 4 via the supply port to flow inside the spool body as shown by arrows a1, a2 of FIG. 2. The jet pipe 18' extends into the interior of the spool 4 and is preferably secured in position e.g. by clamps or screws 29. The supply fluid, which is conventionally supplied at a pressure of around 10 mPa, but may of course be other pressure values including much higher pressures e.g. 21 MPa, flows into the interior of the spool 4 towards the middle (arrows b1, b2) and is drawn up, under pressure, into the end of the jet pipe 18' extending into the spool (arrow c). This end is in fluid engagement with the nozzle 19' as can best be seen in FIG. 2A. Arrows show how the fluid flows from the jet pipe 18' into the nozzle 19' from which it exits as in conventional systems to the receiver 21.

FIG. 2 shows, again by arrows, how the fluid flows from the supply port into the opening(s) 28 into spool 4 and then to the end of the jet pipe 18' extending into the spool. The spool body is sealed at each end by a respective end cap 100.

With this arrangement, the jet pipe 18' can be in the form of a pipe extending into the spool with a connector header piece 30 defining a flow channel from the jet pipe to the nozzle 19'. The header piece 30 can be formed integrally with the pipe or could be formed as a separate piece and attached to the pipe by e.g. brazing or welding. As only the header piece needs to be under pressure, making it as a separate component can be advantageous in terms of manufacturing.

Something is required to steer the nozzle 19' in response to motor current to control the valve by moving the spool. In conventional systems, this is provided by the body of the jet pipe extending out of the spool, preferably within a flexural tube. In the system of EP16461572 and of this disclosure, it is not necessary to have the externally extending jet pipe and so this could be replaced by e.g. a simple wire (not shown) which may be mounted in a flexural tube 26' and which is moved by the motor current to turn the nozzle to provide the desired flow to respective ends of the spool via the receiver.

The jet pipe, supplied by the spool thus also functions as the feedback spring needed in the conventional system.

Such a system has fewer component parts than conventional systems; there is less risk of leakage into the motor chamber as the supply pressure remains within the assembly; fewer connections and joints are required and the assembly can be smaller.

According to the present disclosure, the assembly described above is improved by providing a dedicated means for supplying control fluid to the interior of the spool body, separate from the flow of regulated fluid passing along the exterior of the spool body. The assembly is further improved by providing means for filtering the control fluid before it flows into the interior of the spool body.

Figure 3:
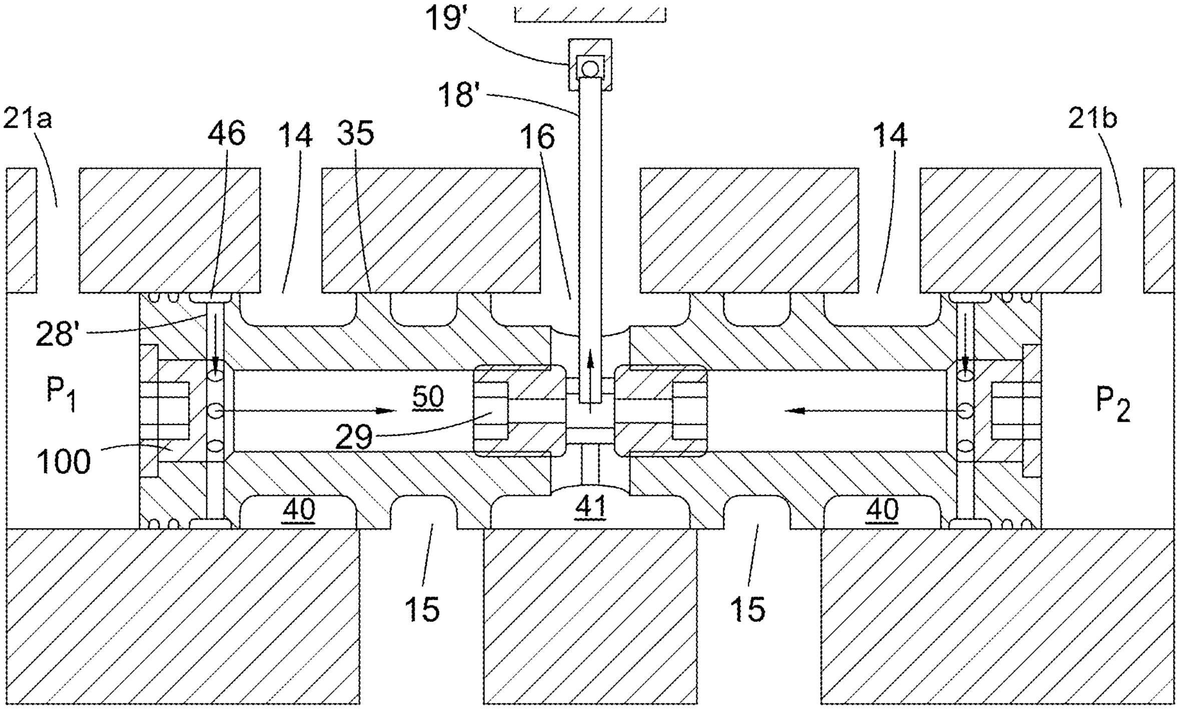
FIG. 3 is a sectional view of an illustrative example servovalve.
Figure 4:
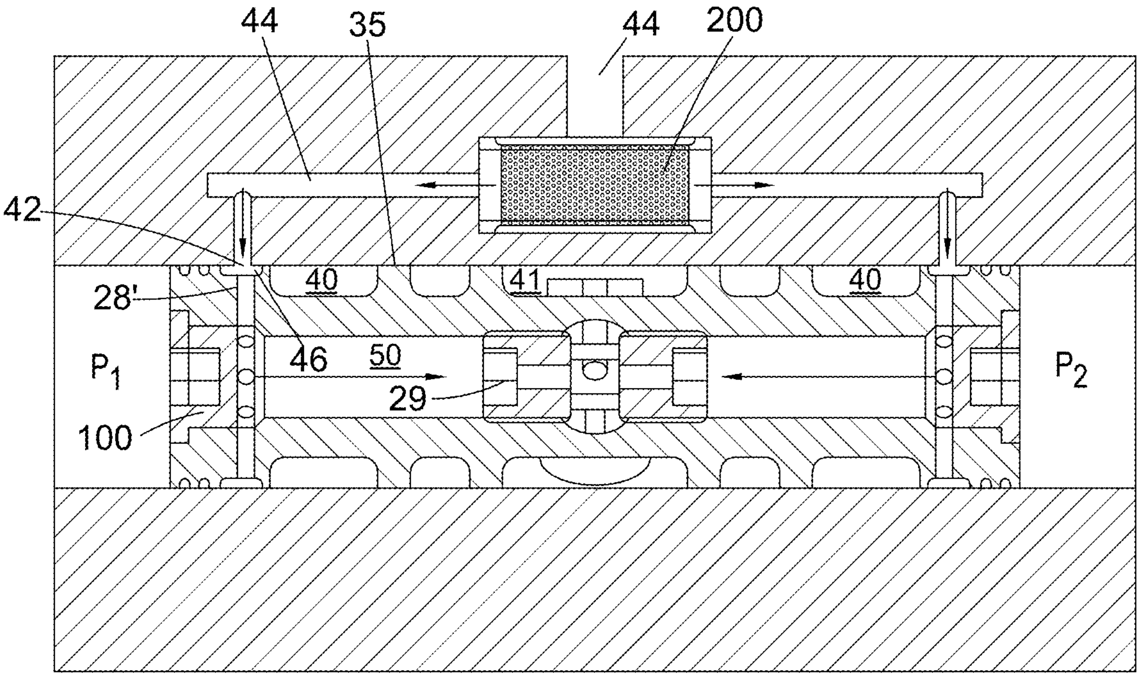
FIG. 4 is another sectional view of the servovalve of FIG. 3.
Figure 5:
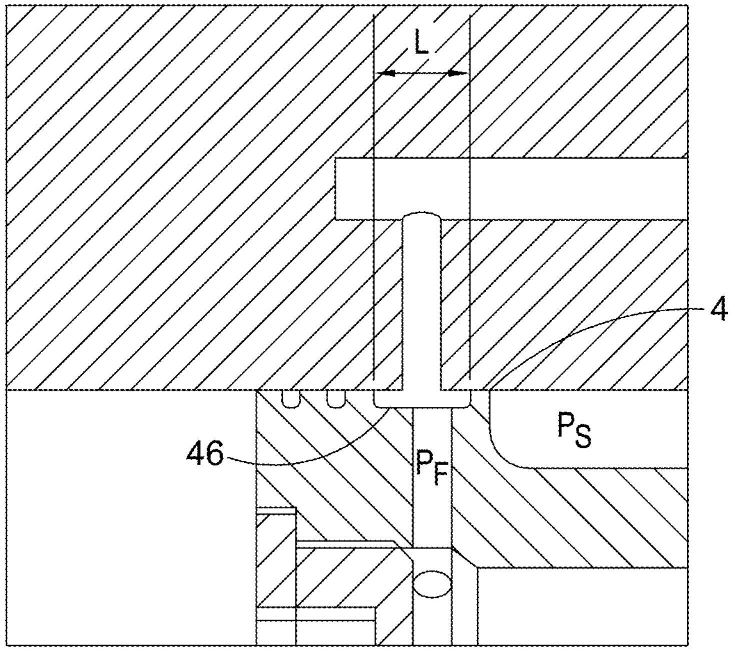
FIG. 5 is a detailed sectional view of an end of the servovalve of FIG. 3.

Referring to FIGS. 3, 4 and 5, the arrangement of the disclosure will be described by way of example. Where components correspond to the above described conventional system, the same references are used.

FIG. 3 shows an example servovalve. The locations of conduits and ports in this figure are for illustrative purposes only.

As in conventional servovalves, a spool 4 is defined by a wall 35 and may be a tubular or cylindrical body (although other geometries are envisaged). The spool 4 is mounted in a spool chamber formed within a fluid transfer valve assembly 5 (e.g., a housing, a supporting block or a support). The fluid transfer valve assembly 5 comprises a pair of primary fluid supply ports 14 and a pair of control ports 15, each opening into the spool chamber and configured for mating with the spool 4. The primary fluid supply ports 14 are configured to be fluidly coupled to a source of pressurised fluid (e.g., at a supply pressure PS), so as to supply the pressurised fluid to be regulated. The fluid transfer valve assembly 5 may comprise a return or suction port 16, also opening into the spool chamber and configured for mating with the spool 4, which is at a return pressure. The return pressure may be maintained at a constant or relatively constant pressure or may vary depending for example on the altitude of the aircraft in flight. The primary fluid supply ports 14 may be coupled to a primary fluid supply conduit, the control ports 15 may be coupled to respective control conduits and the return port 16 may be coupled to a return conduit.

Optionally, only a single primary fluid supply port 14, a single control port 15 and the return port 16 may be present, e.g. the servovalve may be used for selectively supply or draining of fluid to a single control port 15.

Optionally, in either configuration, the return port 16 may be omitted, e.g., the servovalve may be used for selective supply of pressurised fluid to the control port(s) 15, and the regulated fluid may be expelled downstream of the servovalve. The wall 35 of the spool 4 defines a pair of primary fluid supply annuluses 40 along the exterior of the spool 4 for fluid flow along a supply fluid pathway (e.g., a first fluid pathway for pressurised fluid) from each of the supply ports 14 to a respective control port 15. The wall 35 of the spool 4 may further define a return or suction annulus 41 along the exterior of the spool 4 for fluid flow along a return fluid pathway (e.g., a fluid pathway for low pressure fluid) from each of the control ports 15 to the return port 16.

Each end 4*a*, 4*b* of the spool body is positioned such that control fluid is controlled to act against the respective spool ends 4*a*, 4*b* (e.g., under respective control pressures P1, P2) to appropriately move the spool 4 as described above. This controls the flow of regulated fluid from the primary fluid supply ports 14 to the control ports 15 and from the control ports 15 to the return port 16 in response to a control signal, such that the spool 4 regulates the flow of regulated fluid through the control ports 15. The regulated flow through the control ports 15 may be of the order of 10-20 litres per minute.

A pair of openings 28' are formed in the spool wall 35. The openings 28' are positioned away from the primary fluid supply annuluses 40 such that the openings 28' are isolated from the primary fluid supply annuluses 40 and the regulated fluid flow within, when in use, e.g., by lands formed by the wall 35 of the spool 4. The openings 28' may extend traverse to the axis of movement (e.g., perpendicularly to the axis). The openings 28' are configured to supply pressurised fluid to the interior of the spool body (e.g., to supply a control fluid to an interior passage 50).

With reference to FIG. 4, the fluid transfer valve assembly 5 comprises a secondary fluid supply port 42. The secondary fluid supply port 42 is arranged to be coupled with the openings 28' in the spool 4. The secondary fluid supply port 42 is configured to be fluidly coupled with a source of pressurised control fluid (not shown) via a secondary fluid supply conduit 44.

The source of pressurised control fluid may be at the same pressure as the supply pressure. The source of pressurised control fluid which supplies the secondary fluid supply port 42 may be the same as the source of pressurised fluid which supplies the primary fluid supply ports 14.

Alternatively, the source of pressurised control fluid may be at different pressure than the supply pressure (e.g., the source of pressurised control fluid may be a different source than the source of pressurised fluid which supplies the primary fluid supply ports 14). Separating the sources of pressurised fluid may allow for independent control of the maximum regulated pressure and the control pressure. For example, the control pressure may be constant while the maximum regulated pressure may be variable depending on an operational mode of the system. In this way the valve performance and accuracy can be maintained when, for example, using relatively low regulated pressures.

The secondary fluid supply port 42 is arranged to supply control fluid to the interior passage 50 via a control fluid pathway (e.g., a second fluid pathway for pressurised fluid) from the source of pressurised control fluid to the nozzle 19' (see, e.g., FIGS. 3 and 4). The secondary fluid supply port 42 is configured to be isolated from the primary fluid supply port 14 by the wall 35 of the spool 4 (e.g., by lands formed by the wall 35). The flow along the control fluid pathway may be of the order of 0.1-1.0 litres per minute.

A secondary fluid supply annulus 46 may be provided in the spool wall 35 adjacent each opening 28' to ensure a continuous supply of control fluid to the interior passage 50 (via the openings 28') regardless of the axial or controlled position of the spool 4. For example, a length L of the secondary fluid supply annuluses 46 may be sized to match a maximum stroke length of the spool 4 (see, e.g., FIG. 5). That is, the length L of the secondary fluid supply annuluses 46 is selected such as to allow the opening 28' to be continuously mated with the secondary fluid supply port 42 regardless of the axial position of the spool 4.

The openings 28' may be provided at both spool ends 4*a*, 4*b* (e.g., the spool 4 may be substantially axially symmetrical), as shown. The fluid transfer valve assembly 5 may comprise a secondary fluid supply port 42 at each end respectively coupled to openings 28' provided at both spool ends 4*a*, 4*b*. Alternatively, an opening 28' and secondary fluid supply port 42 may only be provided at one spool end 4*a*, 4*b*.

Screws 29 (e.g., hollow or tubular screws) may be provided towards the centre of the spool body to hold the end of the jet pipe 18' in place. The screws can be adjusted if necessary in view of system tolerances.

End caps 100 may be provided as plugs or seals, made of e.g. steel, sealingly secured in the ends of the spool body to prevent leakage of fluid from those ends and to maintain the desired pressure differential across the spool. Alternatively, the end caps 100 may be omitted and the ends of the spool may be sealed in other ways.

The control fluid supplied to the nozzle 19' may be filtered to avoid clogging of the jet pipe/nozzle etc. due to contamination in the fluid. The source of pressurised control fluid may be independently filtered before entering the fluid transfer valve assembly 5. Alternatively, the fluid transfer valve assembly 5 may comprise a filter 200, as shown in FIG. 4. The filter 200 may be placed in the secondary fluid supply conduit 44.

The filter 200 may be a thin-walled filter (in one realisation approx. 0.2 mm) made from metal e.g. steel. The filter 200 provides a filtration surface to filter out particulate matter from the fluid as it passes from the source of pressurised fluid to the secondary fluid supply port 42. The filtration surface may be provided by perforations, where the perforations are sized to prevent passage of debris/particulate matter, but to allow passage of the control fluid (e.g., of the order of 10 μm). One way of forming such perforations is by laser cutting but other methods are also possible.

Advantageously, placing the filter 200 in the secondary fluid supply conduit 44 means that only the control fluid flowing through the interior passage 50 is filtered (e.g., a smaller volume of fluid). Compared to filtering the entire flow of supply fluid (i.e. both the control fluid and the regulated fluid), filtering only this smaller volume of control fluid can increase the filter 200 lifespan. Additionally, filtering the supply fluid reduces its pressure. If the entire flow of supply fluid were to be filtered, then the maximum pressure of regulated fluid that could be supplied to the control ports 15 would also be reduced.

Further advantageously, compared to spools where the filter 200 is incorporated within the spool 4 itself, filtering the control fluid before it enters the spool 4 means that the spool 4 may be reduced in size. A reduction in spool size may improve accuracy and sensitivity of the system.

Further advantageously, compared to spools where the filter 200 is incorporated within the spool 4 itself, a relatively large filtration area is possible providing more reliable and effective filtration, and reducing a pressure drop across the filter 200. The filter 200 is also easily accessible from outside the assembly 5, making the filter 200 easy to remove, clean and replace. It is also not necessary to undo the accurately adjusted screws 29 when removing the filter 200.

The servovalve assembly may further comprise a driver for steering the nozzle 19 in response to a control signal (e.g., a torque motor), as in the conventional servovalve. The driver may include a motor such as a torque motor arranged to steer the nozzle by means of an induced current. Other drivers may be used to vary the position of the nozzle, e.g., a hydraulic power source arranged to steer the nozzle by hydraulic flow. The driver may be mounted in a housing attached to the valve assembly.

Referring to FIG. 5, as a result of passing through the filter 200, the filtered control fluid being supplied to the nozzle 19 is at a lower pressure PF compared to the higher pressure PS of the regulated fluid being supplied via the primary fluid supply port 15. However, the pressure drop due to the filter 200 is relatively small. Consequently, only a relatively small land is required to prevent leakage between the supply annulus 40 and the secondary fluid supply annulus 46, for example as compared to the land separating the regulated fluid supply annulus 40 and the control ports 15, which may be at suction pressure.

Although this disclosure has been described in terms of preferred examples, it should be understood that these examples are illustrative only and modifications and alterations are possible within the scope of the claims.

The invention claimed is:

1. A servovalve comprising:

a fluid transfer valve assembly comprising a primary fluid supply port and a control port;

a moveable valve spool arranged to regulate flow of fluid through a first fluid pathway from the primary fluid supply port to the control port; and a jet pipe assembly configured to axially move the spool relative to the fluid transfer valve assembly in response to a control signal to regulate the fluid flow along the first fluid pathway, wherein the jet pipe assembly comprises a steerable nozzle from which fluid is directed to the ends of the spool in an amount determined by the control signal;

wherein the spool further comprises an opening and an interior passage fluidly coupling the opening to the jet pipe assembly via a second fluid pathway for supplying fluid to the nozzle; and wherein the first fluid pathway is fluidly isolated from the second fluid pathway within the spool;

wherein the fluid transfer valve assembly further comprises a secondary fluid supply conduit having a first end configured to be fluidly coupled to a source of pressurised fluid and a second end coupled to a secondary fluid supply port adjacent the opening of the spool.

2. The servovalve according to claim 1, wherein the secondary fluid supply conduit is provided with a filter for filtering fluid from the source of pressurised fluid before it enters the interior passage of the spool.

3. The servovalve according to claim 2, wherein the spool comprises a secondary fluid supply annulus fluidly coupling the secondary fluid supply port to the opening, and wherein an axial length (L) of the secondary fluid supply annulus is equal to or greater than a maximum travel of the spool.

4. The servovalve according to claim 1, wherein the primary fluid supply port and the secondary fluid supply port are configured to be coupled to a common source of pressurised fluid.

5. The servovalve of claim 1, wherein the fluid transfer valve assembly further comprises a primary supply conduit coupled to the primary fluid supply port and a control conduit coupled to the control port.

6. The servovalve of claim 1, wherein the opening is a first opening provided towards a first end of the spool, and wherein the spool further comprises a second opening provided towards a second end of the spool, the interior passage fluidly coupling the second opening to the jet pipe assembly via the second fluid pathway.

7. The servovalve of claim 1, further comprising:

a driver for steering the nozzle in response to the control signal.

8. The servovalve of claim 7, wherein the driver comprises a motor arranged to steer the nozzle by means of an induced current or wherein the driver is a hydraulic power source arranged to steer the nozzle by hydraulic flow.

9. The servovalve of claim 1, wherein the nozzle is provided at an end of a jet pipe and fluid from the nozzle is directed into the valve assembly via a receiver.

10. The servovalve of claim 9, wherein the receiver comprises lateral receiver channels to provide flow to each side of the fluid transfer valve assembly, and wherein the receiver is configured such that when the nozzle is in a central position, fluid enters the fluid transfer valve assembly evenly via both sides of the receiver, and when the nozzle is steered to an off-centre position, more fluid flows to one side of the fluid transfer valve assembly than the other via the receiver.

11. The servovalve of claim 1, wherein the fluid transfer valve assembly further comprises a second control port and a return port for low pressure fluid returning through the servovalve.

12. The servovalve of claim 1, wherein the nozzle is provided on a jet pipe and is mounted within a flexible tube, wherein the flexible tube is configured to impart movement to the nozzle to steer the nozzle in response to the control signal.

* * * * *